United States Patent [19]

Gerst

[11] Patent Number: 4,621,860

[45] Date of Patent: Nov. 11, 1986

[54] WIND DEFLECTOR AND BUG SCREEN

[76] Inventor: Louie H. Gerst, 815 Miramar St., Cape Coral, Fla. 33904

[21] Appl. No.: 624,252

[22] Filed: Jun. 25, 1984

[51] Int. Cl.⁴ .............................................. B60K 11/02
[52] U.S. Cl. ..................................................... 296/91
[58] Field of Search ...................... 296/91, 1 S, 95 Q; 180/68.6; 160/DIG. 1, DIG. 2, 368 S; 403/403, 205

[56] References Cited

U.S. PATENT DOCUMENTS

| | | | |
|---|---|---|---|
| 3,015,517 | 1/1962 | Thornburgh | 296/91 |
| 3,022,848 | 2/1962 | Heiser | 296/91 X |
| 3,862,777 | 1/1975 | Schifano | 296/91 |
| 3,863,728 | 2/1975 | Mittendorf | 296/91 X |
| 4,052,099 | 10/1977 | Lowery et al. | 296/91 |
| 4,085,964 | 4/1978 | Hutto et al. | 296/91 |
| 4,153,129 | 5/1979 | Redmond | 296/91 X |
| 4,178,034 | 12/1979 | Mittendorf | 296/91 |
| 4,236,592 | 12/1980 | Zeigler | 296/91 |
| 4,364,596 | 12/1982 | Geisendorfer | 296/91 |
| 4,518,191 | 5/1985 | Williams et al. | 296/91 |

Primary Examiner—Randolph A. Reese
Assistant Examiner—Russell D. Stormer
Attorney, Agent, or Firm—Alfred E. Wilson

[57] ABSTRACT

An improved wind deflector including an extruded aluminum support member having a forwardly projecting rounded nose portion to initiate wind deflection, and angularly related generally vertically and horizontally extending walls to receive an acrylic transparent wind deflector member and brackets to secure the extruded member to vehicles. Preferably the extruded support member has vertically extending relatively movable parallel walls to receive and clamp the acrylic wind deflector therebetween in such a manner that it is not necessary to project fasteners through the acrylic member to weaken it or start fractures therein. Also the extruded support member has horizontally extending relatively movable generally parallel walls between which brackets project to secure the extruded member to the vehicle, and wherein clips are employed to secure the brackets to the extruded member. The clips which fasten the brackets to the extruded member are contoured to receive and hold the upper edge of a bug screen, the lower edge of which is yieldingly secured to the vehicle, to protect the cores of air cooling components, and other elements of the vehicle from bugs and other flying objects.

8 Claims, 13 Drawing Figures

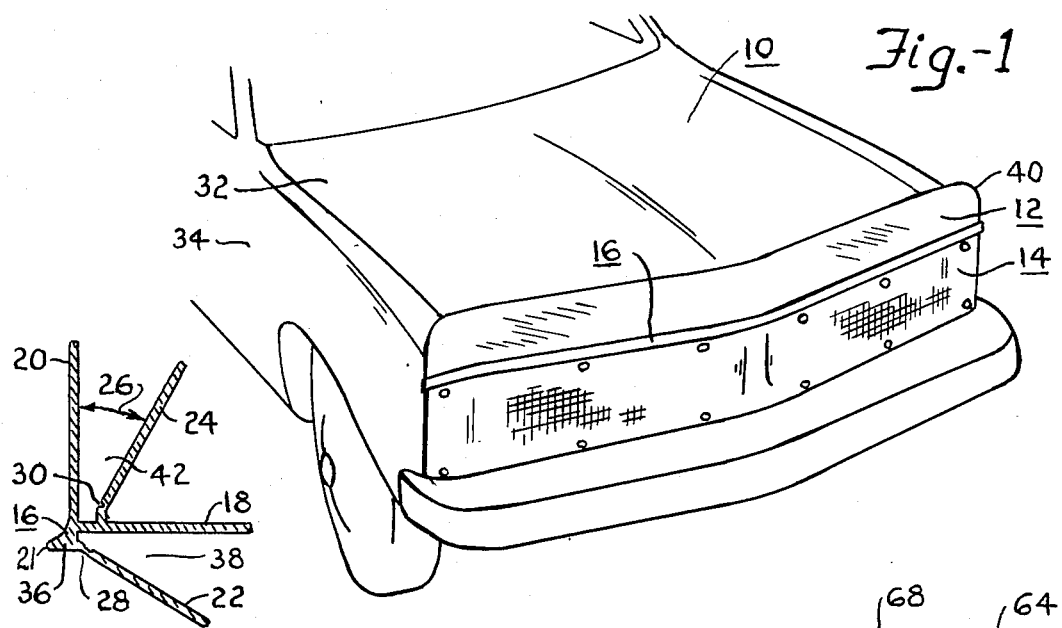
Fig.-1
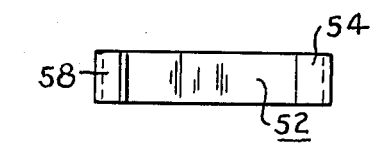
Fig.-2
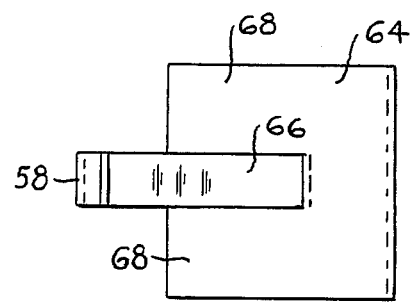
Fig.-8
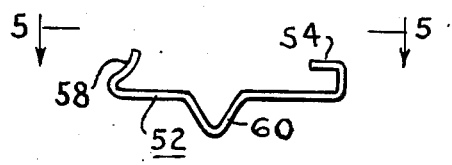
Fig.-5
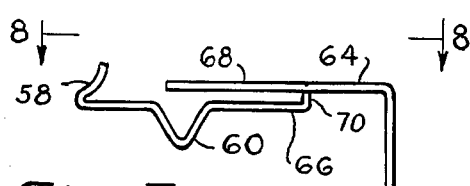
Fig.-4
Fig.-7
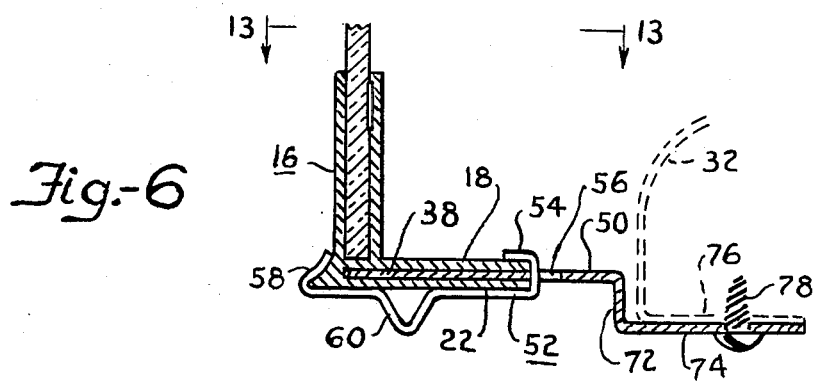
Fig.-6
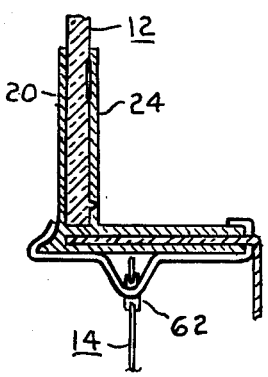
Fig.-3

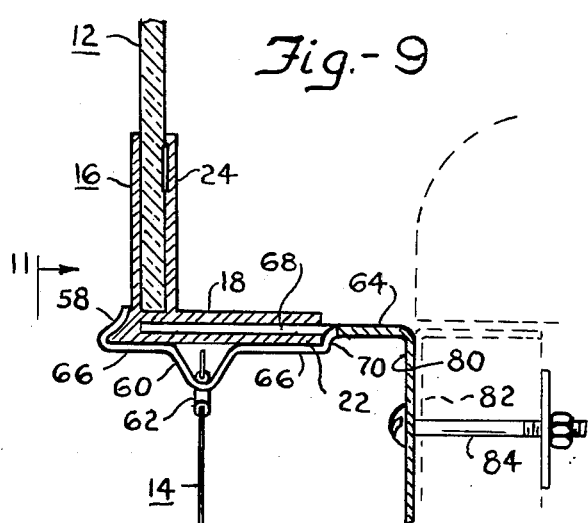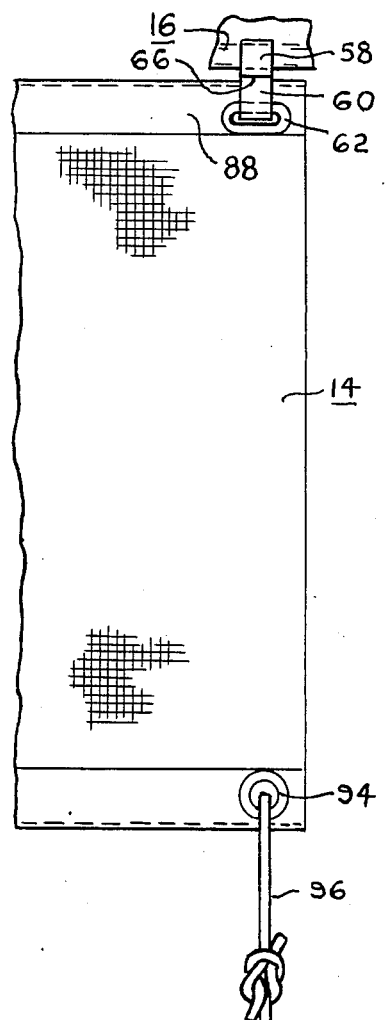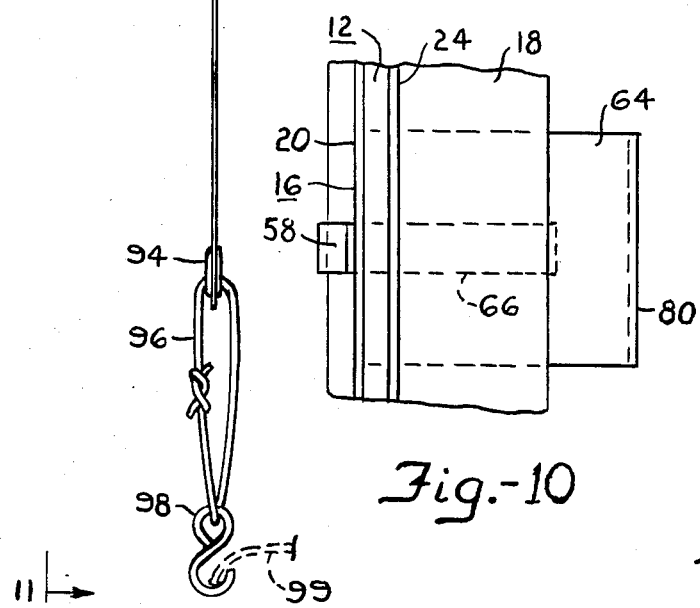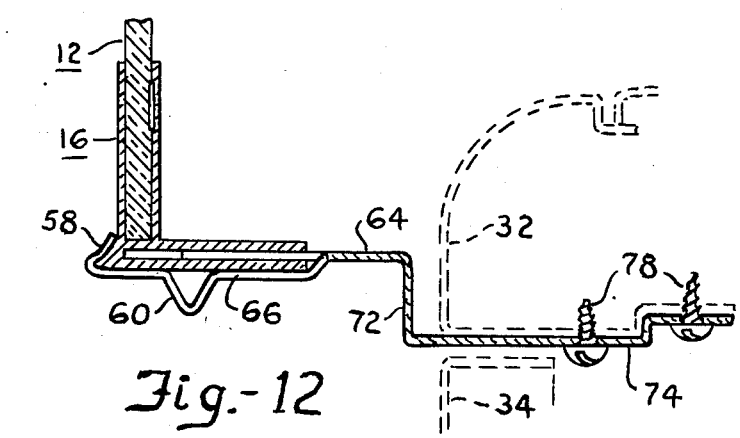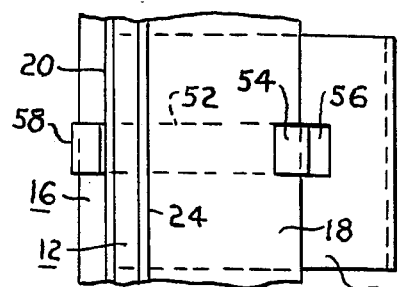

WIND DEFLECTOR AND BUG SCREEN

BACKGROUND OF THE INVENTION

In certain parts of the country flying insects such as the Love Bugs in the Southern States, are prevalent to such a degree during certain seasons of the year as to be a substantial nuisance. This is because, (1) They impinge on the windshield and other parts of the vehicle to such an extent as to render vision through the windshield difficult. They cannot readily be removed because their bodies break up on impact leaving oily deposits, and they impinge in the inlets of the cores of the radiator and other components, and clog up the air passageways through the radiator to such an extent that on occasion the engines overheat, and air conditioning units suffer a loss of efficiency, and they impinge on all of the frontal surfaces of the vehicle and cause an unsightly appearance and cause paint damage.

FIELD OF THE INVENTION

The field of this invention resides in the provision of a wind deflector to deflect air upwardly and any foreign objects in the air such as bugs, rain, dust, snow, etc., to flow above the windshield of vehicles to maintain the windshield and vital parts of the vehicles free from foreign objects which would obstruct the view, or interfere with the operation of such vehicles.

DESCRIPTION OF THE PRIOR ART

Many patents have heretofore issued disclosing so-called wind deflectors secured to the frontal areas of vehicles and intended to protect the windshield and other portions of the vehicles from flying insects and other airborne articles. These patents disclose a broad range of plexiglass and other transparent sheets secured in metallic frames by spaced fasteners, piercing the plexiglass members, and auxiliary fasteners secured to the vehicle and to the wind deflectors.

SUMMARY OF THE INVENTION

This invention is directed to the provision of a wind deflector for vehicles to deflect a flow of air upwardly to carry airborne objects such as insects, bugs, snow, rain, etc., up over the windshield of the vehicle. The wind deflector preferably has an extruded support member adapted to be secured to the vehicle, and having a forwardly directed contoured nose portion to start the deflection of air upwardly, and an acrylic vertically extending member to receive the air stream from the forwardly directed nose and deflect it upwardly above the windshield of the vehicle depending on the speed of the vehicle. The acrylic wind deflector is preferably mounted between parallel generally upwardly extending flanges or walls to support the wind deflector without the necessity of projecting fasteners through the acrylic deflector.

A bug screen positioned to extend across the front of the vehicle to protect the cores of air cooling components, and other portions of the vehicle, from bugs which could clog the passageways in the cores is adapted to be secured to the clips which secure the extruded member to the vehicle.

BRIEF DESCRIPTION OF THE DRAWINGS

Referring now to the drawings wherein similar reference numerals refer to similar parts throughout the several views:

FIG. 1 is a perspective view of the front of a vehicle with the wind deflector and bug screen in place thereon.

FIG. 2 is a sectional view of an extruded member adapted after suitable processing to be secured to a vehicle, and to support the wind deflector and bug screen members.

FIG. 3 is a view similar to FIG. 2 showing the extruded member assembled with the wind deflector and bug screen members, and adapted to be secured to a vehicle.

FIG. 4 is a side elevational view of one form of clip member adapted to engage the extruded member, and to be engaged by the upper edge of the bug screen.

FIG. 5 is a plan view of the clip illustrated in FIG. 4, taken on the line 5—5 of FIG. 4 looking in the direction of the arrows.

FIG. 6 is a fragmentary sectional view illustrating one form of clip bracket for securing the extruded member to the vehicle, and wherein the clip of FIGS. 4 and 5 is employed.

FIG. 7 is a side elevational view illustrating a modified form of bracket for securing the extruded member to the vehicle.

FIG. 8 is a plan view of the bracket illustrated in FIG. 7, and taken on the line 8—8 of FIG. 7 looking in the direction of the arrows.

FIG. 9 is a sectional view illustrating the attachment of the extruded member to a fixed portion of the vehicle and utilizing the bracket of FIGS. 7 and 8.

FIG. 10 is a part sectional plan view of the bracket illustrated in FIGS. 7 and 8.

FIG. 11 is a fragmentary elevational view taken substantially on the line 11—11 of FIG. 9, looking in the direction of the arrows.

FIG. 12 is a sectional view illustrating a modified form of securing the assembly to a vehicle.

FIG. 13 is a plan view taken substantially on the line 13—13 of FIG. 6 looking in the direction of the arrows.

DESCRIPTION OF THE PREFERRED EMBODIMENT

Referring now to FIG. 1 a vehicle 10 is illustrated as having a wind deflector 12 and a bug screen 14 mounted on its front end. The wind deflector 12 is carried at the top of an extruded support member 16, and the upper edge of the bug screen 14 is secured to clips positioned at the bottom edge of the extruded member 16.

As illustrated in FIG. 2 the extruded member 16 has a horizontal fixed bottom wall 18, and a fixed vertical front wall 20. The extruded member 16 has a forwardly extending contoured nose portion 21 adjacent the bottom of the extruded member 16 to initiate the upward deflection of air over the wind deflector. The extruded member 16 also has an angularly related bottom wall 22, and a wall 24 disposed at an angle 26 relative to the vertical front wall 20. The angularly related walls 22 and 24 have areas of reduced thicknesses 28 and 30 near the main body of the extruded member 16 to weaken their supporting structures whereby the walls 22 and 24 can be moved angularly to lie parallel with the walls 18 and 20 without fracturing. These angular relations of the walls 22 and 24 relative to each other are desirable because it permits the members to be inserted between the walls to be assembled if desired between the two closely spaced parallel surfaces.

In the construction and installation of the wind deflector and bug screen on a vehicle, I have found that best results are achieved when the extruded member 16 is positioned to be at the approximate juncture of the hood 32 of the vehicle and the portions of the vehicle body 34 with which the hood meets when in the closed position.

In readying the wind deflector and bug screen for assembly with a vehicle a length of the extruded member 16 as shown in FIG. 2 is cut from an extruded strip. The selected length of the extruded strip 16 is such as to overlie the full width of the vehicle 10 as shown in FIG. 1.

The angularly related bottom wall 22 is deflected to align with and be parallel with the horizontal fixed bottom wall 18, the area 28 of reduced thickness at the juncture of the bottom wall 22 and the contoured main body 36 of the extruded member 16 permitting the wall 22 to flex to move into a position parallel with the fixed bottom wall 18. It will thus be observed that a slot 38 as shown in FIG. 6 is provided between the fixed bottom wall 18 and the angularly related bottom wall 22 when it is moved into a position parallel with the wall 18. The slot 38 is of substantially uniform thickness and is adapted to receive bracket clips by which the wind deflector and optional bug screen is secured to the vehicle 10 as illustrated in connection with the embodiments illustrated in FIGS. 6, 9 and 12.

A wind deflector 12 of appropriate length conforming with the length of the extruded member 16 is selected. The corners 40 of the wind deflector 12 are preferably rounded as desired to present a desirable appearance and to conform with the contouring of the front end of the vehicle 10. The wind deflector 12 is preferably formed of clear acrylic plastic, and is of sufficient thickness to embody adequate strength to withstand the wind velocity to which it is subjected without undesirable deflection.

The bottom edge of the wind deflector 12 is assembled with a strip of double sided adhesive on either side of the wind deflector 12, and it is positioned in the slot 42. The slot 42 is formed by the angled wall 24 positioned at the angle 26 with the vertical front wall 20. The angularly movable wall 24 movable about the area 30 of reduced thickness of the wall 24 is deflected in any desired manner as by a press or jack to move the wall 24 into contact with the double sided adhesive on the wind deflector 12.

The extruded strip 16 with the wind deflector 12 in place thereon is secured to the vehicle 10 by means of a special bracket 50 adapted to project into the horizontal slot 38 in the extruded member 16 and adapted to be clamped thereto by the clip 52 having a contoured end 54 adapted to project through an aperture 56 in the bracket 50 and to overlie the rear edges of the horizontal walls 18 and 22. The forward end 59 of the clip 52 is contoured in conformity with the contouring of the forward nose portion 21 of the extruded strip 16. The central portion of the clip 52 is contoured to provide a V shaped aperture 60 to be engaged by an eyelet 62 at the top of the bug screen 14 as illustrated in FIG. 9.

An alternative type of bracket 64 having an integral clip 66 has a flat plate 68 adapted to project into the slot 38 formed in the extruded member 16 between the walls 18 and 22 of the extruded member 16 as shown in FIGS. 7, 8, 9 and 12. The clip 66 is pierced out of the bracket 64 and has a heel 70 to engage the rear end of the lower wall 22 of the extruded member 16. The integral clip portion 66 has the contoured forward end 58 to engage the forward end of the contoured nose 21 of the extruded member 16, and the V shaped aperture 60 to engage the upper edge of the bug screen 14.

The bracket 50 of the embodiment of FIGS. 4, 5, 6 and 13, and the bracket 64 of FIGS. 7, 8, 9, 10 and 12, have rectangular brackets 50 and 64 adapted to be projected into the slot 38 between the walls 18 and 22 of the extruded member 16, and to be clamped to the extruded member 16 by the clip 52 of FIG. 6 or the clip 66 of FIG. 12. The brackets 50 and 64 can be shifted laterally in the extruded member 16 to position them laterally across the vehicle to provide a sufficient number of brackets to insure adequate support for securing the extruded member 16 to the vehicle.

The portions of the bracket 50 or the bracket 64 positioned to the right hand side of the extruded member 16 are contoured or shaped in any desired manner to secure the extruded member 16 and the wind deflector 12 carried thereby, and the bug screen 14 to the front of the vehicle 10. For example as shown in FIG. 6 the bracket 50 may be contoured as shown at 72 to provide a blade 74 adapted to be secured to the lower surface 76 of the hood 32 by suitable fasteners 78, the contoured end 54 of the clip 52 projecting through the aperture 56 in the bracket 50 to hold the assembly together.

As shown at 80 in FIG. 9 the right hand end of the bracket 64 may be bent downwardly to extend parallel with a fixed portion 82 of the vehicle such for example as a frame surrounding the radiator, or other convenient attaching devices, and secured thereto by suitable fasteners 84. The brackets 50 and 64 can of course be deflected as desired to secure the extruded member 16 to the vehicle.

The attachment of the bracket 64 to the hood 32 of the vehicle 10 is illustrated in FIG. 12. Where this expedient is resorted to the bug screen 14 can be released by merely disconnecting the clips 62 from the V shaped aperture 60 in the brackets 52 or 64.

As illustrated in FIGS. 9 to 11 the upper edge 88 of the bug screen 14 has eyelets 62 to receive clips 60 to engage the V shaped apertures 60 in the clips 52 or 66. The lower edge of the bug screen 14 is provided with eyelets 94 to receive elastic ties 96 carried by hooks 98 adapted to engage an appropriate edge on the vehicle such as the lower rear edge 99 of the bumper.

When utilizing the wind deflector and bug screen secured to the hood 32 of the vehicle, it is common practice to unhook the hooks 98 fastening the lower edge of the bug screen 14 prior to lifting the hood to do any necessary checking or repairs to the engine. After the hood 32 is again closed the lower edge of the bug screen 14 is again secured with hooks 98.

I claim:

1. A wind deflector for a motor vehicle comprising an elongated extruded support member adapted to be secured transversely to the front of the vehicle, an acrylic wind deflector secured to the extruded support member and extending upwardly therefrom, the extruded member having a forwardly extending contoured nose portion adjacent the bottom of the extruded member and extending the full length of the extruded member to initiate the upward deflection of air over the wind deflector, and a clip releasably connected to the nose portion to secure the support member to the vehicle.

2. The invention defined in claim 1 wherein the extruded member has a pair of spaced parallel walls adjacent its bottom to receive therebetween spaced brackets operably connected to the extruded member to secure the extruded member to the vehicle.

3. The invention defined in claim 2 wherein the brackets have clips to overlie the nose of the extruded member to clamp the brackets to the extruded member.

4. The invention defined in claim 3 wherein the clips are integral parts of the brackets.

5. The invention defined in claim 3 wherein the brackets are apertured, and the clips project through the apertures to engage the rear edges of the parallel walls and extend forwardly beneath the extruded member to overlie and engage the contoured nose portion of the extruded member.

6. The invention defined in claim 3 wherein the clips are contoured, the motor vehicle has air cooled elements having cores and a bug screen is positioned beneath the extruded member to protect the cores of air cooled elements from flying bugs and the upper edge of the bug screen is detachably secured in the contoured clips, and the bottom edge of the bug screen is detachably connected to the vehicle.

7. A wind deflector for a motor vehicle comprising an extruded member having a body portion and a forwardly projecting contoured nose portion adjacent the bottom of the extruded member, and having a fixed vertically extending front wall and a fixed horizontally extending bottom wall, an angularly inclined vertical wall positioned rearwardly of the front fixed wall and an angularly inclined horizontal wall positioned beneath the horizontal wall, areas of reduced thicknesses between the body portion of the extruded member and the angularly inclined walls to permit said walls to be shifted angularly to lie substantially parallel with the vertical and horizontal walls, a plurality of spaced attaching brackets positioned between the horizontal walls are adapted to secure the wind deflector to a vehicle, clips engaging the contoured nose portion of the extruded member are associated with the brackets to secure the brackets between the horizontal walls, the brackets being apertured to permit the clips to project through the apertured brackets and engage the rear ends of the horizontal walls.

8. A wind deflector for a motor vehicle comprising an elongated extruded support member adapted to be secured transversely to the front of the vehicle, an acrylic wind deflector secured to the extruded support member and extending upwardly therefrom, the extruded member having a forwardly extending contoured nose portion adjacent the bottom of the extruded member to initiate the upward deflection of air over the wind deflector, the extruded member has a pair of spaced parallel walls adjacent its bottom to receive therebetween spaced brackets to secure the extruded member to the vehicle, the brackets have clips to overlie the nose of the extruded member to clamp the brackets to the extruded member, the brackets are apertured, and the clips project through the apertures to engage the rear edges of the parallel walls and extend forwardly beneath the extruded member to overlie and engage the contoured nose portion of the extruded member.

* * * * *